United States Patent [19]

Wilson et al.

[11] 4,087,953
[45] May 9, 1978

[54] COMBINE CROP FEEDING SYSTEM

[75] Inventors: John Edward Wilson, Colona, Ill.;
Edward John Hengen, Bettendorf,
Iowa

[73] Assignee: Deere & Company, Moline, Ill.

[21] Appl. No.: 736,440

[22] Filed: Oct. 28, 1976

[51] Int. Cl.² ............................................. A01D 41/06
[52] U.S. Cl. .................................... 56/14.6; 130/27 T
[58] Field of Search ................................ 56/14.4–14.6,
56/16.4; 130/27 H, 30 H, 27 T

[56] References Cited

U.S. PATENT DOCUMENTS

| | | | |
|---|---|---|---|
| 2,946,170 | 7/1960 | Anderson | 56/16.4 |
| 3,306,302 | 2/1967 | Mark et al. | 130/27 H |
| 3,468,112 | 9/1969 | Landgrebe | 56/364 |
| 3,769,988 | 11/1973 | Burenga | 130/30 H |
| 3,998,035 | 12/1976 | Towson, Jr. | 56/13.5 |

Primary Examiner—Russell R. Kinsey

[57] ABSTRACT

A combine has a feeding system, for conveying crop material from a harvesting unit to the infeed rotor of a longitudinal axial flow rotary crop processing unit, including a feeder house employing a pair of augers, mounted side by side in an enclosed housing, and contrarotating at a relatively high speed. The augers are cantilevered from a bulkhead at the inlet end of the feeder house and do not make contact with the housing. The housing cross section does not conform to the cylindrical surfaces swept by the augers and there is also space between the augers themselves so that heterogeneous material can be conveyed within the housing on all sides of the augers. Housing shape and clearances are designed so that there is a minimum of dead space in the housing and, with some assistance from fixed strippers, mounted inside the housing parallel to the axes of the augers, material is conveyed generally linearly at a speed nearly equal to the equivalent axial speed of the auger flighting. A transition housing, between the feeder house and infeed rotor casing, is shaped to minimize dead space at the point of transfer from the feeder house augers to the infeed rotor, so that the moving elements (augers and rotor) do not lose control of the material being conveyed. A feeder beater is used at the feeder house throat to strip material from the harvesting unit cross auger and assist in accelerating it in the feeder house.

23 Claims, 7 Drawing Figures

COMBINE CROP FEEDING SYSTEM

BACKGROUND OF THE INVENTION

This invention relates to a feeding system for a combine and in particular to means for conveying crop material from the harvesting means to the crop processing means.

Although combine field capacities continue to increase and the appetites of their threshing and separating mechanisms grow ever larger, the archaic chain and slat conveyor is still conventionally employed in the feeder house. Such conveyors have a relatively low specific capacity (throughput per unit of width), because of limitations which include an inability to feed positively, and a tendency to backfeeding because of the necessary presence of an at least partially open return side. In addition, the potential for increasing capacity by increasing the linear speed of the conveyor is severly limited by the inherent instability of the conveyor chain.

In recent years, with the adaptation of the combine to corn harvesting and the introduction of the corn head, auger conveyors came into use in association with said corn heads. Partly because the first corn heads were designed to harvest two rows at a time and partly because of the configuration of the conventional transverse threshing cylinder, a pair of side-by-side augers were used to convey the crop material to the threshing cylinder. However in spite of being paired, the individual augers were typically treated as single auger conveyors. Initially, the augers, in their separate troughs, were separated by a dividing wall but it was eventually realized that long stalk material might be better handled with an open center in the conveyor and the dividing wall was lowered, creating an opportunity for crop material to distribute itself across the width of the conveyor and reduce the incidence of plugging. However, the augers remained in side-by-side troughs, the space between their opposing conveying surfaces consequently being at least partially occupied by sheet metal, and much of the potential conveying capacity surrounding the augers was not used. Typically, these augers were journaled at their inlet end in self-aligning bearings and supported towards their delivery ends by their troughs, a design severly limiting rotational speeds and hence conveying capacity. A pair of augers have been placed side by side in a single trough with their flighting overlapping in an attempt to achieve more positive conveying, but such an arrangement sacrifices some of the potential capacity of the conveyor and increases the tendency for crop material to wrap around the augers.

Twin auger conveyors have also been used in feeding the crop processing units in legume harvesters. But in this application, as well as in the corn head, emphasis is placed on avoidance of crushing or restricting the crop material to reduce both plugging and damage to the material itself. And so in these systems, feeding of the crop to the processing unit is not positive or consistent and feeding rate varies greatly with the condition of the material being fed.

The characteristics of single augers, especially when handling homogeneous granular materials in closed housings, are well known and their performance is predictable. But in existing applications, such as the corn and legume harvesters mentioned above, twin augers have been used mainly to provide a "moving floor"-type conveyor for the conveying of crop material, possessing some advantage over the slat conveyor but not intrinsically different in conveying characteristic. Nowhere has there been recognized or realized the potential for positive, compact and efficient conveying of a pair of augers, side by side and fully enclosed, optimally spaced from each other and from the walls of their housing to produce a conveyor of high specific capacity and predictable performance.

In recent years, efforts to develop a successful combine using a longitudinal axial flow rotary crop processing unit have intensified. Such units have a much greater specific capacity than conventional units, and the difficulty of feeding them at full capacity has been a major obstacle in development. Feeding devices not only need greater capacity but, in particular for single rotor configurations, should be capable of delivering material in a relatively narrow stream with an axial component of velocity sufficient that, typically, it can be received by an infeed rotor for distribution around the circumference of the first stage of an axial flow rotary mechanism without energy consuming or capacity reducing major changes in direction.

The large number of patents issuing in recent years in the field of feeding axial flow rotary threshers and separators is evidence that much attention is being given to a difficult problem. But typically in these attempts, chain and slat conveyor feeder houses have been used, and their limitations in this application are soon realized. Apart from the inherent limitations of the slat conveyor as such (outlined above), it is only marginally adaptable to axial feeding of a single rotor longitudinally disposed unit because of the need to converge the stream of crop material from the relatively wide slat to the narrower rotor.

The patents referred to disclose mostly refinements in the juxtaposition of the slat feeding conveyor and the infeed rotor and in the design of the rotor rather than any attack on the more fundamental problem of the feeder conveyor itself, and until the present invention, there has been no evience of a breakthrough in this area.

SUMMARY OF THE INVENTION

The present invention provides a positive, compact and efficient feeding system of high specific capacity and predictable performance which is, in addition, particularly adaptable to feeding the crop processing unit of an axial flow rotary combine.

Additional attributes of the system are: (a) capability for receiving large masses of relatively slow moving heterogeneous crop material from the harvesting unit and accelerating and conditioning it for reception by the longitudinally disposed infeed rotor of the axial flow rotary crop processing unit, (b) ability to control the material and feed it uniformly and positively without backfeeding, and (c) conveyor width to match the diameter of an axial flow infeed rotor of similar capacity and provide a flow path without impeding transitions.

A feature of the invention is the harnessing of the potential of a pair of side-by-side augers for handling a heterogeneous mixture of crop material positively and efficiently. Material is placed and held in a close conveying relationship with the conveying surfaces of the augers so that it is not carried around by them but moves parallel to the axes of the augers with little slippage, and certainly no backfeeding, so that the conveyor force-feeds, with a capacity proportional to the speed of rotation of the augers. Contributing to high efficiency and capacity is the tendency for straw and stalks to become aligned with the augers upon entering the conveyor.

Another feature of the invention is the controlled conveying of material outside the periphery of the augers. Use of a housing cross section which does not conform to the cylindrical surfaces swept by the augers, such as the rectangular shape used here, produces two important results. First, where the housing diverges from the auger periphery, conveying channels are created above and below, between and alongside the augers (not just on top as in conventional dual auger conveyors) this increasing capacity for the conveying or heterogeneous crop material. Second, at the points where the housing walls converge on the periphery of the augers, an inherent stripping action occurs so that material is not carried around by the augers. The clearances between housing and augers may be optimized to produce the best combination of conveying space and stripping effect.

A particular feature of the invention is the synergistic result produced by feeding the space between the augers so that their mutually opposed conveying surfaces may cooperate in conveying with a minimum of parasitic friction. The direction of rotation of the augers is such that material conveyed between them tends to be carried downwards but this is prevented by a narrow stripper mounted substantially below the center line of the augers.

Another feature making an important contribution to the invention is the provision of a cantilevered spindle and bearing arrangement for the support of the augers. Thus, the housing shape and clearances are no longer limited by the need to provide support for the augers along their length or at their delivery ends. And because of the improvement in auger stability, auger rpm can be radically increased and the invention may be termed a high speed auger feeder house. High auger speed increases specific capacity and accelerates crop material so that it can be discharged with high axial velocity such as that required, for example, to feed satisfactorily the infeed rotor of an axial flow rotary combine. Disposition of the delivery end of the augers very close to such an infeed rotor and the provision of a uniquely shaped transition housing between the feeder house and the infeed rotor casing, keep dead space to a minimum so that the main moving elements of the system (augers and rotor) do not lose direct control of the material being conveyed. The infeed rotor receives a concentrated but manageable stream of material which it conveys rearward and distributes around the circumference of the first stage of the crop processing unit.

Still another feature of the invention, particularly applicable when the feeder house is used with a conventional harvesting unit, is the employment of a feeder beater at the feeder house throat to strip material from the cross auger of the harvesting unit and assist in accelerating it into the feeder house.

DESCRIPTION OF THE PREFERRED EMBODIMENT

Figure 1:
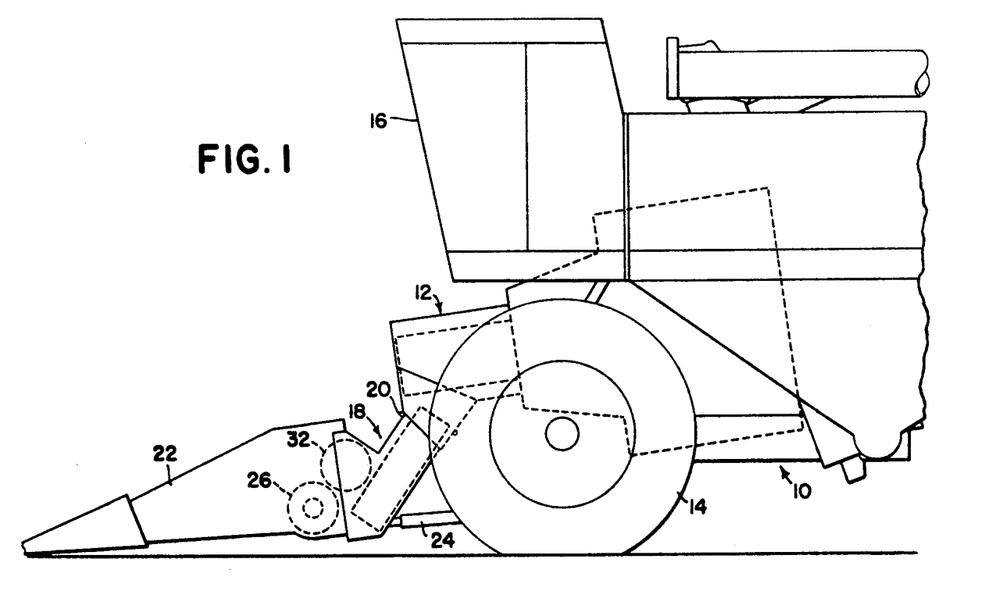
FIG. 1 is a side elevation of the forward part of a combine embodying the invention.

The invention is embodied in a self-propelled combine having a mobile main body 10 which includes a crop processing unit 12, a pair of forward drive wheels 14, and a forwardly mounted elevated operator's station 16. FIG. 1 shows the forward part only of such a combine with the crop processing unit 12 shown mostly in dotted outline, the crop processing unit being of the longitudinal axial flow rotary type.

A forwardly and downwardly inclined feeder house 18 is mounted on transverse pivot means 20 at the forward end of the crop processing unit. A harvesting unit such as a corn head 22 is rigidly mounted at the forward end of the feeder house. A pair of hydraulic cylinders 24 extends between the combine frame (not shown) and the feeder house for pivoting the feeder house about pivots 20 so as to vary the operating height of the corn head 22. As is well known, in combines of this type, the harvesting unit 22 removes crop from the field and delivers it to the feeder house 18, which in turn conveys it to the crop processing unit 12.

Figure 2:
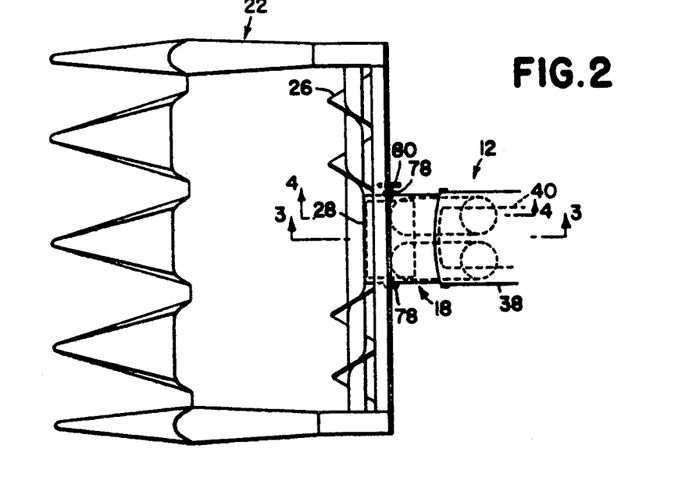
FIG. 2 is a partial top view showing the relationship of the harvesting unit (corn head) to the feeding system.

The harvesting unit 22 includes a cross auger 26, shown best in FIG. 2, which delivers crop through a central discharge opening 28 in its rear wall. The discharge opening 28 communicates with a throat 30 of the feeder house 18 (FIG. 2). An axially transverse, rotary, paddle-type feeder beater or impeller 32 in the throat of the feeder house helps strip material from the cross auger 26 and delivers it rearwardly. A pair of side-by-side upwardly and rearwardly inclined augers 34 are mounted in the feeder house and convey the material upwardly and rearwardly through a transition housing 36 into a rotor casing 38, where it is received by an infeed rotor 40, which feeds it to the first processing stage of the crop processing unit, the infeed rotor 40 being coaxially associated with the forward end of the rotor (not shown) of the rotary crop processing unit 12.

Figure 5:
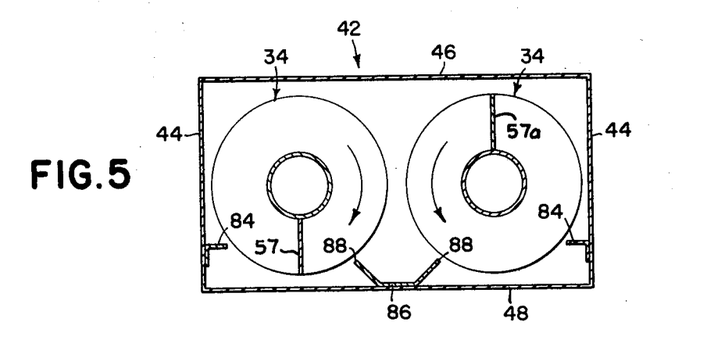
FIG. 5 is an enlarged semi-schematic transverse cross sectional view taken along line 5—5 of FIG. 3 to show the disposition of the augers with respect to the housing walls and of the strippers with respect to the augers.

The feeder house 18 includes a main body or housing 42, shown in diagrammatic cross section in FIG. 5, which is of rectangular cross section and has a pair of upright side walls 44, a top wall 46, and a floor 48. The top wall 46 terminates close to the rear of the feeder beater 32 and a hood 50 for the feeder beater extends upwardly and forwardly from the front of the top wall. A transverse ledge-like projection 51 at the junction of the hood 50 and the top wall 46 of the feeder house serves as a stripper for the feeder beater 32.

A bulkhead 52 extends perpendicularly from the floor 48 of the feeder house at its forward end. The upper edge of this bulkhead 52, the forward edges of the feeder beater hood 50, and the forward edges of the upright side walls 44 define the entrance to the throat 30 of the feeder house.

Each conveyor auger 34 includes conventional helical flighting 54 mounted on an auger tube 56 and the augers are identical except for the flighting which is of opposite hand. The augers are timed so that transversely aligned points of the outer or converging edges of the flighting of the respective augers are not directly opposed when they approach each other as the augers rotate so as to reduce pinching of material between the opposed flighting edges. Single helix augers, as used in this embodiment, are preferably timed 180° apart as indicated in FIG. 5 which shows a typical rotational juxtaposition of transversely aligned elements of the side-by-side augers, delineated by the cutting plane of this cross sectional view and designated by the numerals 57 and 57a. The augers are mounted parallel to the floor and sides of the housing and functional clearances are provided between the augers, and between the augers and housing on all sides.

Figure 4:
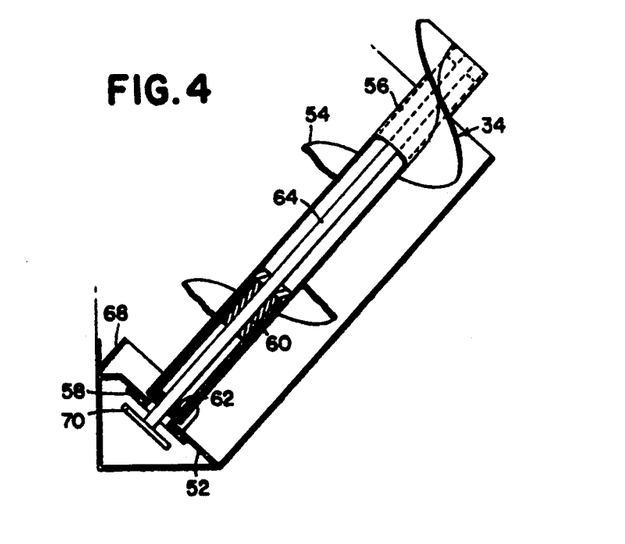
FIG. 4 is an enlarged partial sectional side elevation taken on line 4—4 of FIG. 2, showing the cantilevered auger support structure.

For each auger, a bearing housing 58 is rigidly mounted in the bulkhead 52 and extends rearwardly and upwardly perpendicular to the bulkhead (FIG. 4). Inner 60 and outer 62 bearings are spaced within the housing. A shaft 64 is rigidly mounted within and attached to the auger tube 56, and is journaled in the bearings 60 and 62, the shaft extending through an opening in the bulkhead. Thus, the augers are cantilevered from the bulkhead 52. The lower end of the auger tube 56 forms a sleeve over the bearing house 59 and terminates close to the bulkhead 52. Shields 68 are rigidly attached to the bulkhead and shield the gap between the end of the auger tube 56 and the bulkhead 52 to prevent wrapping of crop material.

Figure 6:
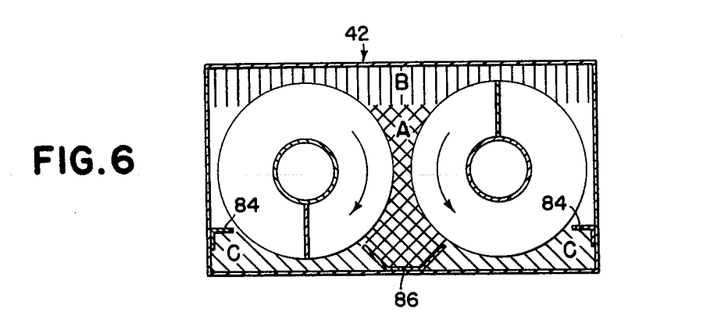
FIG. 6 is a view similar to FIG. 5 to show the location of the principal conveying zones within the housing.

The augers 34 are driven in mutually opposite directions by conventional means from an engine (not shown) on the combine and means such as roller chain and sprockets 70 mounted on the auger shafts 64, the direction of rotation being indicated by arrows in FIGS. 5 and 6.

The feeder beater 32 consists of two radially extending diametrically opposed paddles 74 extending substantially the full width of the feeder house throat 30, rigidly mounted on a transverse shaft 76 and including radially outward sections 77 of resilient material. The shaft 76 is journaled in bearings 78, mounted in the side walls 44 of the housing. The feeder beater is driven in a counter-clockwise direction as viewed in FIG. 3 by conventional means from the combine engine and means such as a chain (not shown) and a sprocket 80 mounted on an extension of shaft 76.

A pair of side strippers 84 shown best in FIGS. 5 and 6 are mounted on the opposite side walls 44 and a central stripper 86 is mounted on the floor 48 of the housing 42, the strippers running parallel to the axes of the augers and extending the full length of the housing. The central stripper 86 has a pair of stripping edges 88 extending outwards and upwards towards the auger centers. Running clearances between the strippers and the auger flighting are held to a minimum.

Communication between the delivery end of the feeder house 18 and the infeed rotor casing 38 is accomplished by the fixed transition housing 36 attached to the rotor casing and providing a controlled passage for crop material from the rectangular cross section opening of the end of the feeder house body 42 to an opening 90 in the cylindrical rotor casing 38. A generally semi-circular bulkhead 92 closes the upper half of the forward end of the casing 38, the bulkhead terminating on a horizontal center line of the casing. The opening 90 in the casing is defined by the intersection with the casing of an inclined transverse plane indicated by the line X—X in FIG. 3 passing through the lower edge of the bulkhead 92 and extending rearwardly and downwardly to emerge from the bottom of the casing.

The transition housing 36 includes a front rectangular bulkhead 94 extending vertically downwards from the coplanar with the front bulkhead 92 of the casing 38 and terminating adjacent the pivot 20 and a pair of side walls indicated generally by the numeral 95. The side walls 95 include a pair of opposite parallel portions 96, extending rearward and downwards from the opposite sides of the front bulkhead 94 generally parallel to the side walls of the feeder house 44 and overlapping and lying closely outside the feeder house side walls so as to effectively form an extension of them, and a pair of opposite converging wall portions 97 converging inwardly and rearwardly from the upper rearward edges of the parallel wall portions 96. The transition housing further includes a floor or feed plate 98, lying in approximately the same plane as the floor 48 of the feeder house (when the latter is in an intermediate position). The floor 98 includes a forward triangular-shaped portion 99 with the apex of the triangle meeting the lowest part of the opening 90 of the rotor casing 38 on the longitudinal center line of the casing. A pair of concave wall sections 100 on opposite sides of the transition housing, extend between the converging wall portions 97 and the rear edges 102 of the trangular floor portion 99 of the housing and the curved edge of the opening 90 in the cylindrical portion of the rotor casing.

Figure 7:
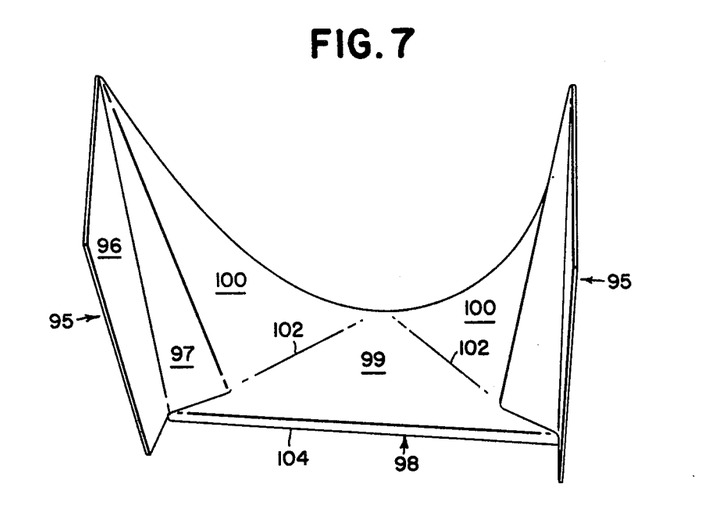
FIG. 7 is an enlarged left front perspective of the transition housing with its front bulkhead removed.

The forward edge of the floor 98 of the transition housing is indicated by the numeral 104 in FIG. 7 and is parallel to the plane of the floor 48 of the feeder house and perpendicular to the axes of the augers 34. It will be seen from FIG. 3 that although the floor 98 of the transition housing generally meets the floor 48 of the feeder house there is a transverse gap between them which will vary in width as the operating height of the harvesting unit is changed and the feeder house pivots about pivot 20. A spring-loaded flap 106, hinged at its rearward end to the forward edge of the floor 98 of the transition housing and extending under the floor of the feeder house, is provided to prevent loss of crop material through the gap onto the ground. Spring means (not shown) bias the flap 106 upwards to hold it in sliding contact with the under side of the feeder house floor 48 throughout the pivoting range of the feeder house.

The infeed rotor 40 of the crop processing unit has helical flighting 108 of extended pitch. Helical ribs 110 are carried on the inside of the rotor casing 38.

Figure 3:
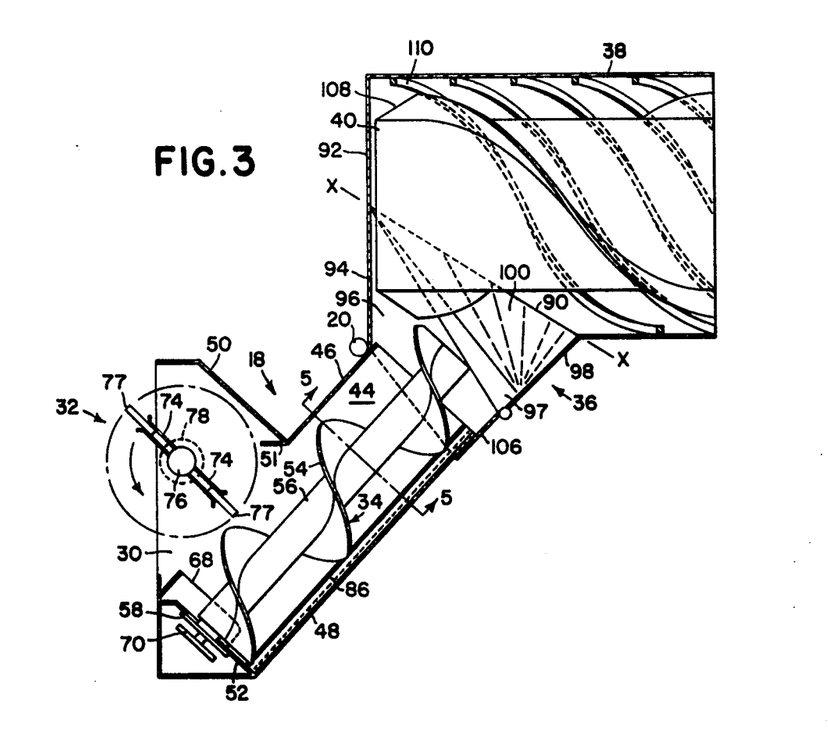
FIG. 3 is an enlarged partial sectional side elevation taken along line 3—3 of FIG. 2 showing the principal components of the feeding system.

In operation, the harvesting unit 22 gathers crop material from a field and delivers it through the rear discharge opening 28 to the throat 30 of the feeder house 18. The paddles 74 of the feeder beater 32, rotating downwardly and rearwardly, assist in stripping material from the cross auger 26 of the harvesting unit and give it an initial acceleration in the feeder house. As can be seen in FIGS. 1 and 3, the paddles 74 sweep close to the augers 34 so that most material is forced immediately into conveying contact with the augers. Material carried past this point is stripped from the feeder beater paddles by the stripper 51 and taken over by the augers for conveying through the body 42 of the feeder house.

Although material is conveyed on all sides of the augers, three types of feeding channels or zones between the auger periphery and the housing walls may be distinguished, each zone making a particular contribution to the total conveying capacity (see FIG. 6). The principal and most efficient feeding zone is labeled zone A in FIG. 6, and is disposed between the augers. Auger direction of rotation is such that material tends to be carried between the augers and is maintained there by the stripping action of the central stripper 86, which presents a narrow conveying surface to the crop material and cooperates with the conveying surfaces of the augers 34 to convey material efficiently with a minimum of parasitic friction. The bulk of long straw or stalk material is carried in zone A at speeds of 80% or 90% of the equivalent axial velocity of the auger flighting. Some long material is carried at somewhat lower speeds in the zone above the augers labeled B in FIG. 6. Shorter material including ears of corn tend to be conveyed in the lower outer lateral zones labeled C.

The side walls of the feeder house 44 are tangentially close to the augers 34 and due to the relative convergence of the walls upon the periphery of the auger flighting, the walls themselves tend to limit the rotational movement of any material which may have been carried past the edges 88 of the central stripper. However, this action may be enhanced by longitudinal strippers 84 mounted on the side walls 44 below the point of tangency.

The dimensions of the functional clearances between the augers and between augers and housing walls critically affect performance of the conveyor. For example, for best performance with aguers of 280 mm diameter the following clearances are recommended; between the peripheries of the two augers 30 mm, and between the inside of the feeder housing and the auger peripheries — 30 mm above the augers, 8 mm at the sides and 20 mm below.

It will be noted that the use of a housing cross section which does not conform to the cylindrical envelopes swept by the augers creates conveying channels on all sides of the augers thus making available more of their potential conveying capacity. At the same time the maximum radial distance of the housing walls from the periphery of the augers has been limited and the augers retain control of the crop material so that it is force fed through the housing at a mean axial velocity approaching the equivalent axial velocity of the auger fighting.

As explained above, with the augers being cantilevered from the bulkhead 52 and supported entirely by the bearings 60 and 62, high rotational speeds are possible, although slower speeds may be selected for some applications and will give proportionately good performance. Typical regular rotational speeds for this design are in the range 1,000 to 1,200 rpm, corresponding to an equivalent axial auger flighting speed of about 6 ½ meters/second when augers of 280 mm diameter are used. In this environment, the mean axial velocity of crop material being conveyed in the feeder house will be about 5 meters/second.

Because of the high rotational speed of the augers 34, crop material is discharged at high velocity through the transition housing 36 onto the infeed rotor 40 for delivery to the crop processing unit 12. It will be noted that delivery to the rotor is undershot (upward and rearward) and, in that the bulk of the delivery from the feeder house 18 to the rotor is inset from the end of the rotor, the rotor is intermediately fed rather than end fed.

Note also that the feeder house 18 is no wider than the rotor casing 38 (FIG. 2) so that little convergence of the crop material need take place in the transition between the feeder house and the rotor 40. Furthermore, a substantial portion of the crop material including the more troublesome long material is delivered from conveying zones A and B in a relatively narrow stream almost directly into the flighting of the infeed rotor.

It will be understood that many forms for the transition between the feeder house and the rotor casing are physically possible. Variables may include the general disposition, inclination and shape of the opening in the cylindrical rotor casing, the degree of symmetry of the housing about the longitudinal center line of the machine and the treatment of the extensions of the feeder housing walls and floor. In discovering and developing the particular form used in this embodiment, the overriding principle employed was that of material control — that is, ensuring that material remains under the control of the moving elements by minimizing dead space and maintaining the smoothest of transitions so as to avoid any deceleration of material resulting in turbulent flow.

In this feeding system, the design and performance of the conveyor augers, the feeder housing and the transition housing have been developed and matched to be particularly compatible with the crop receiving characteristics of an infeed rotor of an axial flow rotary crop processing unit and to provide a system of high specific capacity.

We claim:

1. In a combine having a harvesting means equipped to gather crop material from a field and deliver it to a discharge opening, and a crop processing means, the combination therewith of an improved feeder house for conveying crop material from the harvesting means to the crop processing means and comprising:
   a feeder housing having walls, an inlet communicating with the discharge opening of the harvesting means, and an outlet;
   a pair of bearing means carried rigidly by the housing;
   a pair of side-by-side conveyor augers respectively rotatably mounted on said bearing means in cantilever fashion and extending within the housing so that in operation the augers are entirely supported by the bearing means and do not touch the housing walls, said walls surrounding the augers and including a plurality of continugous wall portions generally parallel to the auger axes, said wall portions variously and circumferentially converging towards and diverging from the auger peripheries and including top and bottom portions closely spaced from the augers so as to create a plurality of longitudinally extending spaces constituting feeding channels parallel and adjacent to the augers including channels above and below the augers in which crop material is confined and moved in a controlled conveying relationship by the augers; and
   drive means operatively connected to the augers for rotating said augers in opposite directions so that crop material is conveyed along said feeding channels from the inlet to the outlet of the housing.

2. The invention defined in claim 1 wherein auxiliary longitudinal stripping means are carried by the housing walls and cooperate with those walls and the conveyor augers to control movement of crop material in the feeding channels.

3. The invention defined in claim 2 wherein the direction of auger rotation is such that, as viewed in the direction of auger axes, the left-hand auger turns clockwise and the right-hand auger counterclockwise.

4. The invention defined in claim 3 wherein one of the stripping means is mounted between the augers.

5. The invention defined in claim 4 wherein said housing walls include a pair of opposite upright side walls.

6. The invention defined in claim 4 wherein the conveying augers have axes of rotation lying approximately in a common plane and are of equal pitch and have peripheral conveying edges, said augers being timed with each other so that transversely aligned points of the conveying edges of the respective augers pass through the plane of the auger axes between the augers at different times.

7. The invention defined in claim 6 wherein the crop processing unit is of the axial flow rotary type and includes an infeed rotor disposed to receive material from the feeder house and delivery of said material is undershot with respect to the infeed rotor.

8. The invention defined in claim 7 wherein the infeed rotor has a receiving end and a discharge end and the feeder house delivers crop material to the infeed rotor intermediate between the receiving and discharge ends.

9. The invention defined in claim 8 wherein the feeder house includes a feeder beater, transversely and rotatably mounted in the feeder housing inlet to assist in moving crop material from the harvesting unit into the feeder house.

10. In a combine having a forward mounted harvesting means, including a rearward directed discharge opening and adapted to gather crop material from a field and deliver it through said opening, and a crop processing unit having a receiving opening, the combination therewith of an improved means for conveying crop material from the harvesting means to the crop processing unit and comprising:
  a housing having an inlet end rigidly attached to the harvesting unit in a crop receiving relationship with said discharge opening, and an outlet end forward of and below the crop processing unit and in a crop delivery relationship with said unit, said housing being pivotally mounted on the combine adjacent the inlet end of said housing and below the discharge opening of the harvesting means and top, bottom and opposite side walls;
  a pair of bearing means carried rigidly by the transverse bulkhead;
  a pair of side-by-side conveying augers, respectively entirely supported by the bearing means within the housing and adapted to be driven at equal rotational speeds but in mutually opposite directions so that crop material is conveyed from the inlet to the outlet of the housing, said housing walls being generally parallel to the axes of the augers and each of said walls being disposed so as to confine crop material closely adjacent the augers and each wall diverging from the periphery of the augers in at least one place so as to create a plurality of controlled conveying channels outside the periphery of the augers; and
  stripping means carried by at least one of the housing walls and disposed adjacent to the augers and cooperating with them and with the housing walls to confine the crop material and hold it in a close conveying relationship with the augers so as to constitute a force feed conveyor.

11. In a harvesting machine having a forward harvesting header adpated to remove crop material from a field and deliver it rearwardly through a header discharge opening and a rotary axial flow crop processing unit having a generally fore-and-aft axis and infeed rotor at its forward end for moving crop material rearwardly, the combination therewith of an improved crop feeding system for moving crop material from the header to the infeed rotor and comprising:
  a feeder housing having a forward inlet communicating with the header discharge opening and a rearward outlet;
  a plurality of generally fore-and-aft and parallel rotating augers mounted side by side in the feeder housing and adapted to move crop material from the inlet to the outlet;
  a generally cylindrical rotor casing surrounding the infeed rotor and including a cylindrical side wall, a forward end wall, and a downwardly and forwardly facing inlet opening formed by the intersection of a downwardly and rearwardly inclined plane with the forward end wall approximately at the level of the intersection of the rotor axis with the wall and the cylindrical side wall, the inlet opening being adjacent to but spaced upwardly and rearwardly from the rearward end of the augers; and
  a transition housing disposed between the feeder housing outlet and the casing inlet opening for directing crop material from the outlet to the inlet opening.

12. In a combine having a forward mounted harvesting unit for removing crop material from a field and delivering it rearwardly, and an axial flow rotary crop processing unit disposed with its axis of rotation generally fore and aft and having an infeed rotor adapted to receive crop material and convey it rearwardly, the combination therewith of an improved means for conveying crop material from the harvesting unit to the infeed rotor comprising:
  a generally cylindrical rotor casing surrounding the infeed rotor and including an upright forward bulkhead, a cylindrical side wall, and a feed opening having edges lying in a rearwardly and downwardly inclined transverse plane passing through the forward bulkhead approximately on a horizontal line and emerging from the bottom of the casing side wall;
  a feeder house carried by the combine below the infeed rotor and disposed to receive crop material from the harvesting unit and convey it upwardly and rearwardly through the rotor casing feed opening to the infeed rotor, said feeder housing including a housing having a generally rectangular discharge opening, the opening including a pair of opposite upright edges and top and bottom edges, the top edges being generally parallel to and below the forward edge of the rotor casing feed opening, and a pair of contrarotating conveyor augers mounted side by side in the housing and having delivery ends disposed adjacent to the infeed rotor; and
  a transition housing between the feeder house discharge opening and the rotor casing feed opening and including a generally triangle-shaped floor having a forward directed base generally meeting the bottom edge of the feeder house discharge opening and two rearward directed sides and an apex, the apex meeting the edge of the rotor casing feed opening adjacent the bottom side of the rotor casing and including a pair of opposite concave walls extending from the sides of the triangle to meet the edge of the rotor casing feed opening and the upright edges of the feeder house discharge opening, the transition housing shape thus generated minimizing the space between the augers and infeed rotor not swept by them so as to maintain material control and uniform flow in the feeding system.

13. The invention defined in claim 12 wherein the width of the feeder house is approximately equal to the diameter of the rotor casing.

14. The invention defined in claim 13 wherein the length of the base of the triangle-shaped transition housing floor is less than the width of the feeder house and the transition housing thus generated converges towards the rotor with funnelling effect.

15. The invention defined in claim 14 wherein the plane of the edge of the feed opening in the rotor casing is transverse and inclined downwards and rearwards at an angle of approximately 30° to the longitudinal axis of the rotor.

16. In a harvesting machine having a forward harvesting header adapted to remove crop material from a field and deliver it rearwardly through a header discharge opening and a rotary axial flow crop processing unit having a generally fore-and-aft axis and an infeed rotor at its forward end for moving crop material rearwardly, the combination therewith of an improved crop feeding system for moving crop material from the header to the infeed rotor and comprising:
a feeder housing having opposite side walls, an upwardly and rearwardly inclined floor, a top wall, a forward inlet communicating with the header discharge opening, and a rearward outlet;
a generally cylindrical casing surrounding the infeed rotor and having an inlet opening;
a transition housing connecting the housing outlet to the casing inlet opening;
a pair of parallel augers mounted side by side in the housing, closely adjacent to one another with their axes in a common upwardly and rearwardly inclined plane;
bearing means carried by the feeder housing and operatively journaling the augers;
drive means operatively connected to the augers for rotating the respective augers in opposite directions at a rotational speed of at least 500 revolutions per minute with their inner sides moving downwardly, the augers respectively having oppositely wound flighting so that they move crop material upwardly and rearwardly within the housing, the top wall, floor and opposite side walls being respectively closely spaced from the augers so as to confine crop material into the area immediately surrounding the augers, whereby the crop material is accelerated within the housing to approximately the linear speed of the auger flighting and the rotational speed of the augers is such that its momentum carries it through the outlet, the transition housing and the casing inlet opening.

17. The invention defined in claim 16 wherein the housing includes a transverse bulkhead above the forward end of the floor, the bearing means being mounted on the bulkhead and supporting the augers in cantilever fashion above the floor.

18. The invention defined in claim 17 wherein the housing inlet is disposed immediately above the bulkhead so that crop material enters the housing on top of the forward end of the augers.

19. The invention defined in claim 16 wherein the forward end of the top wall diverges upwardly and forwardly to the top of the inlet to form an enlarged throat area above the forward end of the augers, and further including a transverse rotary impeller mounted in the throat area and extending between the housing side walls, the forward side of the impeller moving downwardly to assist in feeding crop material through the housing inlet to the augers.

20. The invention defined in claim 19 wherein the header includes a transverse auger adapted to converge crop material and deliver it rearwardly through the header discharge opening and the rotary impeller is mounted above and rearwardly adjacent to the header auger so that it strips crop material from the header auger to assist in moving the crop material to the augers in the feeder housing.

21. The invention defined in claim 16 and including a first pair of elongated, fore-and-aft stripper elements respectively mounted on the floor adjacent the lower, inner peripheries of the respective augers to prevent lateral movement of material underneath the auger peripheries.

22. The invention defined in claim 21 and including a second pair of elongated, fore-and-aft stripper elements respectively mounted on the opposite housing side walls adjacent the lower, outer peripheries of the respective augers to prevent upward movement of material outside the auger peripheries between the augers and the respective side walls.

23. A combine having an axial flow crop processing unit including a casing and at least one threshing and separating rotor rotating in the casing about an approximately fore-and-aft axis, the casing having a forward crop-receiving opening, and a harvesting unit with a rearward discharge opening and feeding means for transferring crop material from the harvesting unit discharge opening to the casing crop-receiving opening for engagement by the rotor, the feeding means including a feeder housing having opposite side walls, a top wall and a bottom wall, an inlet communicating with the header discharge opening and an outlet communicating with the casing crop-receiving opening, feeding elements enclosed in the feeder housing, and drive means operatively connected to the feeding elements so that they move crop material within the housing from the inlet to the outlet, characterized in that:
the feeding elements include a pair of side-by-side conveyor augers and the drive means rotates the augers in opposite directions, the augers respectively having oppositely wound flighting, and at least the top and bottom walls of the feeder housing are closely spaced from the periphery of the augers to confine crop material in a close material conveying relationship with the augers.

* * * * *

UNITED STATES PATENT OFFICE
CERTIFICATE OF CORRECTION

Patent No. 4,087,953     Dated 9 May 1978

Inventor(s) John Edward Wilson and Edward John Hengen

It is certified that error appears in the above-identified patent and that said Letters Patent are hereby corrected as shown below:

Column 9, line 42, after "combine" insert --adjacent its outlet end and including a transverse bulkhead--.

Column 9, line 68, delete "adpated" and insert --adapted--.

Column 10, line 3, after "and" insert --an--.

Column 10, line 22, after "the" (first occurrence) insert --forward--.

Column 10, line 55, delete "edges" and insert --edge--.

Signed and Sealed this

Sixth Day of February 1979

[SEAL]

Attest:

RUTH C. MASON
Attesting Officer

DONALD W. BANNER
Commissioner of Patents and Trademarks